(12) United States Patent
Minakata et al.

(10) Patent No.: US 6,363,189 B1
(45) Date of Patent: Mar. 26, 2002

(54) DIRECTIONAL COUPLER

(75) Inventors: Makoto Minakata, Hamamatsu; Jungo Kondo, Aichi; Tatsuo Kawaguchi, Gifu; Minoru Imaeda, Nagoya, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/520,113

(22) Filed: Mar. 7, 2000

(30) Foreign Application Priority Data

Mar. 26, 1999 (JP) .............................. 11-083277

(51) Int. Cl.⁷ .............................. G02B 6/26; G02B 6/42
(52) U.S. Cl. .................. 385/41; 385/2; 385/8; 385/132; 359/326
(58) Field of Search .............................. 385/41, 42, 40, 385/1, 2, 8, 9, 132; 359/326

(56) References Cited

U.S. PATENT DOCUMENTS

| | | | | |
|---|---|---|---|---|
| 5,349,466 A | * | 9/1994 | Delacourt et al. | 359/326 |
| 5,479,552 A | * | 12/1995 | Kitamura et al. | 385/132 |
| 5,504,772 A | * | 4/1996 | Deacon et al. | 372/102 |
| 5,570,225 A | * | 10/1996 | Harada | 359/326 |
| 6,055,342 A | * | 4/2000 | Yi et al. | 385/2 |
| 6,101,296 A | * | 8/2000 | Tavlykaev et al. | 385/2 |
| 6,236,772 B1 | * | 5/2001 | Tavlykaev et al. | 385/2 |

OTHER PUBLICATIONS

Minakata, Makoto and Chang, Chiaming, Optical Directional Coupler Switch with Domain Inversion, Mar. 12, 1999, pp. 61–68, Contains English Abstract.

* cited by examiner

Primary Examiner—Hemang Sanghavi
Assistant Examiner—Scott Knauss
(74) Attorney, Agent, or Firm—Burr & Brown

(57) ABSTRACT

A directional coupler including a substrate having a length and containing a material that exhibits electrooptic properties, the substrate being divided into a plurality of reversed polarization domains along a direction of length. At least two optical waveguides are formed in the substrate in the direction of length thereof and substantially parallel to a main surface thereof. An electrode is disposed above a portion of each optical waveguide for modulating light waves propagating through the waveguides, respectively, the electrode being divided equally by at least a portion of a boundary surface between the plurality of reversed polarization domains.

23 Claims, 6 Drawing Sheets

Fig. 3
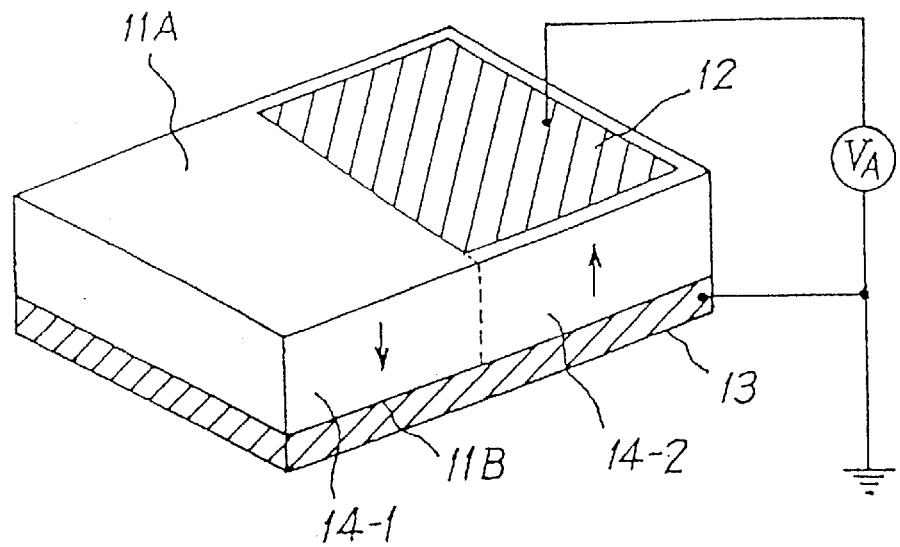
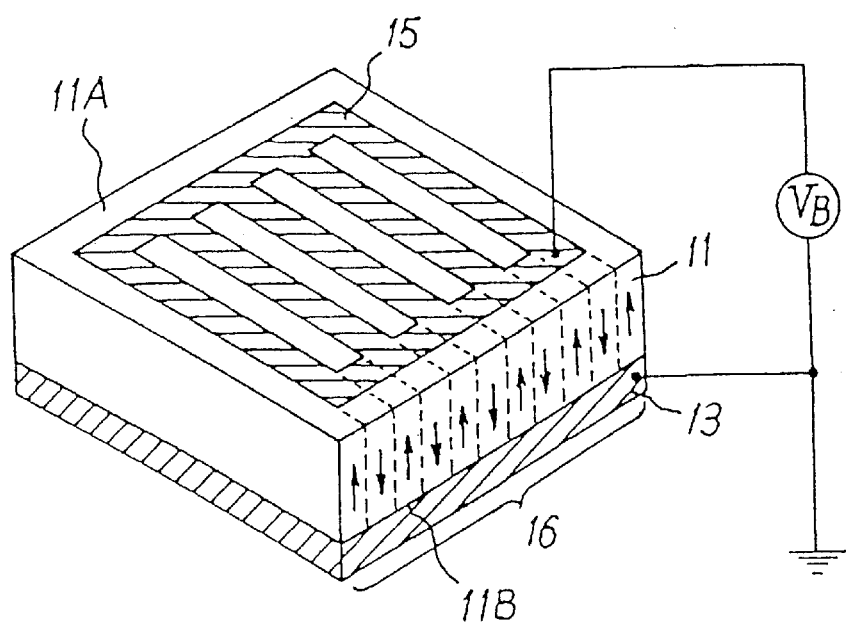
Fig. 4

DIRECTIONAL COUPLER

BACKGROUND OF THE INVENTION

The present invention relates to a directional coupler. More specifically, the present invention relates to a directional coupler that can be used effectively in the field of ultra fast communications such as ultra fast switches.

With the recent growth of multimedia, the volume of information being used has increased dramatically. Thus, in ultra fast communication fields such as optical communications, there has been a demand for converters that provide power in the class of gigabits/sec in order to handle such large amounts of information. Using conventional electronic switches for these ultra fast converters, i.e., ultra fast switches, has been difficult. Thus, the development of optical switches capable of ultra fast switching has become an urgent task.

Currently, directional-coupler optical switches are generally used as ultra fast optical switches. Examples of typical directional couplers include uniform $\Delta\beta$ directional couplers and reversed $\Delta\beta$ directional couplers. In uniform $\Delta\beta$ directional couplers, two optical waveguides are arranged on a substrate having electrooptic properties separated from each other by a predetermined distance. A uniform electrode is disposed on each of these optical waveguides. Potentials having opposite signs are applied to the electrodes to modulate the phases of the light waves guided through the optical waveguides, thus adjusting the coupling ratio of these light waves and providing high-speed switching.

In order to make the cross-state "on" in this type of directional coupler, a coupling length $L_0$ for the optical waveguides must be set to $\pi/2\kappa$ (where "$\kappa$" is the coupling coefficient). Production issues made this difficult to achieve.

With reversed $\Delta\beta$ directional couplers, two optical waveguides are disposed as described above, and two electrodes are arranged on each of the optical waveguides, giving the appearance that a single uniform electrode has been divided into two parts. Then, potentials are applied to the electrodes so that potentials with opposite signs are applied to the adjacent electrodes on each optical waveguide as well as the electrodes on the two different optical waveguides that face each other. This application of opposite potentials results in modulation of the phases of the guided light, thus adjusting the coupling ratios of the light waves and providing high-speed switching.

With this type of directional coupler, the applied potential can be controlled so that the bar-state is "on" or the cross-state is "on" even if the optical waveguide coupling length does not fulfill the conditions described above.

In a further development of the reversed $\Delta\beta$ directional coupler, an electrode in four pieces gives the appearance of a uniform electrode, and potentials with different signs are applied to the pieces. The application of opposite potentials to electrodes divided into a plurality of pieces can be easy to control so that the bar-state is "on" or the cross-state is "on." As a result, drive potential (switching potential) can be decreased. Thus, out of the directional couplers described above, it would be desirable to use the reversed $\Delta\beta$ directional coupler or the further developed version of the same, based on the advantages described above.

Where a plurality of electrodes are formed in a reversed $\Delta\beta$ directional coupler and the like, however, temperature drift can occur due to differences in the sizes and the shapes of the electrodes. This in turn can lead to unstable drive potential. A possible measure to overcome this type of drift is to provide a buffer layer of Si or the like in addition to $SiO_2$ between the substrate and the electrodes. However, providing a thick buffer layer will result in a higher drive voltage. Also, an Si layer will not be able to completely eliminate drift. Furthermore, to provide switching, the signal electrodes must be divided, and production of traveling wave electrode structures is difficult and prevents increases in speed.

SUMMARY OF THE INVENTION

An object of the present invention is to provide a new directional coupler that has a low drive potential, provides a complete (100%) "on" state for the bar-state and the cross-state at ultra fast speeds of several tens of gigahertz or more, and is theoretically capable of eliminating temperature drift.

The present invention provides a directional coupler that includes a substrate having electrooptic properties, two optical waveguides formed in the substrate roughly parallel to a main surface of the substrate, and an electrode arranged on each optical waveguide for modulating light waves passing through the respective waveguides. The substrate is divided into a plurality of reversed polarization domains along a direction of progression of the light waves and the electrodes effectively are divided equally by an extension of a boundary surface between the plurality of reversed polarization domains. As a result, the electrodes are effectively equivalent to two electrodes arranged side-by-side along each optical waveguide.

The directional coupler according to the present invention provides an electrode structure equivalent to that of the reversed $\Delta\beta$ directional coupler, but potential can be reduced since division is easier. Additionally, since the polarizations of the adjacent polarization domains are reversed and the electrodes separated by the boundary surface have the same electrode area, there are equal and opposite loads in the electrodes that cancel each other out (i.e., there is no load in the electrodes). Temperature drift is substantially eliminated since there is no load in the electrodes.

As in uniform $\Delta\beta$ directional couplers, in the directional coupler according to the present invention, only the uniform electrodes on the optical waveguides actually modulate the light waves. Thus, the electrode structure is simple and traveling wave electrodes can be formed, in contrast to the reversed $\Delta\beta$ directional coupler, which uses electrodes on each optical waveguide that are effectively divided in two. Thus, ultra fast switching is made possible with the present invention.

Furthermore, since sets of adjacent domains having the same area and opposite polarization directions are formed in the substrate directly under the electrodes, pyroelectric loads also cancel each other out. This allows temperature drift to be eliminated even if there is a buffer layer. Thus, temperature drift is limited and variations in drive potential can be prevented.

Furthermore, compared to reversed $\Delta\beta$ directional couplers with divided electrodes, the directional coupler according to the present invention allows the use of traveling wave electrodes, which are uniform electrodes, and a plurality of effective electrode divisions can be implemented by dividing the substrate into a plurality of reversed polarization regions. Thus, high-speed, low-potential operations are possible and temperature drift can be substantially eliminated.

The present invention also provides a method of making a directional coupler comprising the steps of providing a substrate comprising a material that exhibits electrooptic properties, subjecting the substrate to a polarization treatment to create at least two reversed polarization domains separated from one another by a boundary surface that lies substantially perpendicular to opposed main surfaces of the substrate and substantially perpendicular to the direction of length of the substrate, forming at least two optical waveguides in at least one of the two main surfaces of the substrate, the waveguides extending generally in the direction of length of the substrate and intersecting a planar extension of the boundary surface, and forming an electrode above a portion of each optical waveguide for modulating light waves propagating through the waveguides, respectively, each electrode being divided substantially equally by the planar extension of the boundary surface.

BRIEF DESCRIPTION OF THE DRAWINGS

For a more complete understanding of the nature and objects of the invention, reference should be made to the following detailed description of a preferred mode of practicing the invention, read in connection with the accompanying drawings, in which:

FIG. 3 is a perspective drawing showing an example of a method for forming reversed polarization domains;

FIG. 4 is a perspective drawing showing another example of a method for forming reversed polarization domains;

DETAILED DESCRIPTION OF THE PREFERRED EMBODIMENTS

Figure 1:
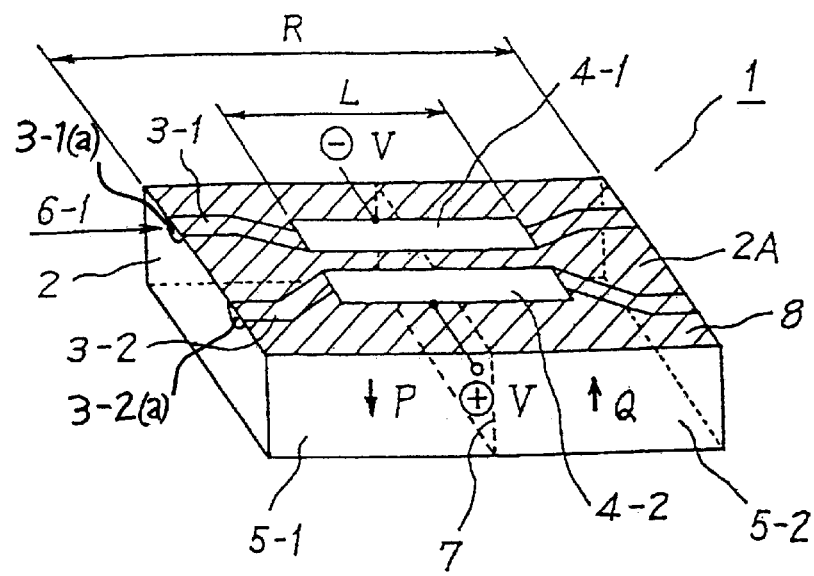
FIG. 1 is a perspective drawing showing an example of a directional coupler according to the present invention.

FIG. 1 is a perspective drawing showing an example of a directional coupler according to the present invention. The directional coupler 1 includes a substrate 2 having electrooptical properties (e.g., lithium niobate single crystal), directional coupler optical waveguides 3-1 and 3-2 formed by Ti diffusion or the like in the substrate 2, a buffer layer 8 formed to cover optical waveguides 3-1 and 3-2, and electrodes (e.g., gold) 4-1 and 4-2 formed on buffer layer 8.

In the directional coupler according to the present invention, substrate 2 is divided into a plurality of reversed polarization domains along the direction of propagation of light waves. In the embodiment shown in FIG. 1, substrate 2 is divided into a first polarization domain 5-1 having a polarization direction P that is roughly perpendicular to a main surface 2A of substrate 2, and a second polarization domain 5-2 having a polarization direction Q that is opposite to that of the polarization direction P.

The electrodes 4-1 and 4-2 are divided into two equal sections by a boundary surface 7 between first polarization domain 5-1 and second polarization domain 5-2. Optical waveguides 3-1 and 3-2 have independent input ports 3-1(a) and 3-2(a), respectively, and approach each other at the centers thereof at a length L. Mode coupling takes place between light waves guided by optical waveguides 3-1 and 3-2. In the directional coupler 1, the length L corresponds to the electrode length, and the length "R" corresponds to the substrate length.

While substrate 2 is formed from a set of two adjacent domains having opposite polarizations (i.e., first polarization domain 5-1 and second polarization domain 5-2), any number of domains can be used provided the domains are formed in sets that are adjacent to each other and have reversed polarizations. In particular, using four domains will result in a drive potential that is 22% that of uniform $\Delta\beta$ couplers and 50% that of reversed $\Delta\beta$ couplers.

Figure 2:
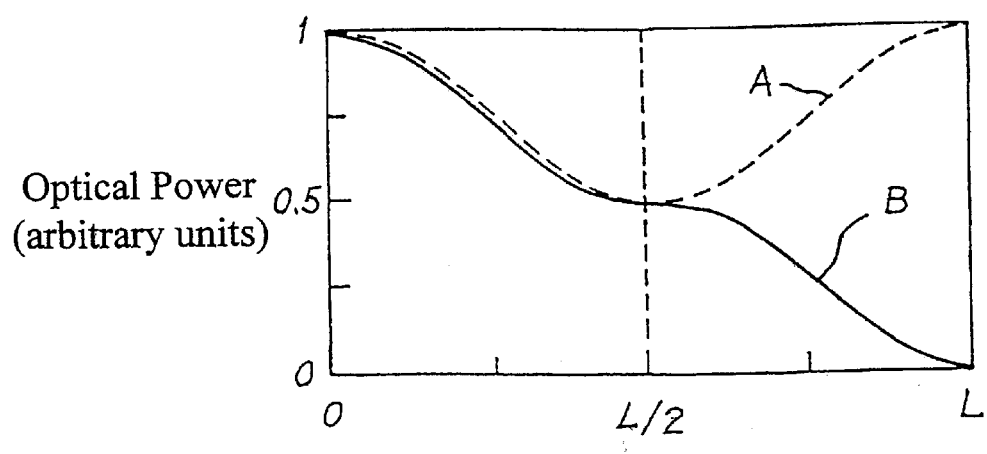
FIG. 2 is a drawing showing the switching states of a light wave in the directional coupler according to the present invention.

FIG. 2 shows the switching status of light waves in a directional coupler according to the present invention, wherein plot "A" represents the bar state and plot "B" represents the cross state of the coupler. A light wave 6-1 introduced into optical waveguide 3-1 has an initial (arbitrary) power of "1". A predetermined potential of $V=V_x$ is applied to electrodes 4-1 and 4-2 so that, at the point where optical waveguide 3-1 reaches boundary surface 7 between polarization domain 5-1 and polarization domain 5-2, the mode coupling with a propagation constant difference $\Delta\beta$ results in a power transfer rate to optical waveguide 3-2 of ½.

When boundary surface 7 is passed, the reversal of polarization domain 5-2 relative to polarization domain 5-1 results in the equivalent of a potential of $V=-V_x$ being applied to the light wave. Thus, since mode coupling is taking place with a propagation constant difference $-\Delta\beta$, with only the sign reversed from what was described above, the opposite process takes place, and the optical power is transferred to optical waveguide 3-2 (see plot "B") and a state of "1" is achieved in optical waveguide 3-2. Thus, when a potential of $V_x$ is applied, the cross-state is in a completely (100%) "on" state relative to light wave 6-1 introduced into optical waveguide 3-1.

To make the bar-state "on", a predetermined potential of $V=V_=$ is applied so that all power returns to optical waveguide 3-1 when light wave 6-1 introduced into optical waveguide 3-1 reaches boundary surface 7. As a result, the bar- state is "on" even when boundary surface 7 is passed and reversed polarization domain 5-2 is reached. Thus, when a potential of $V_=$ is applied, the bar state is turned completely (100%) "on" relative to light wave 6-1 introduced into optical waveguide 3-1, and the optical power in optical waveguide 3-1 is "1" at the end of coupling length L (see plot "A"). With a similar process, a light wave introduced into optical waveguide 3-2 can turn the cross-state and the bar-state "on".

Figure 8A:
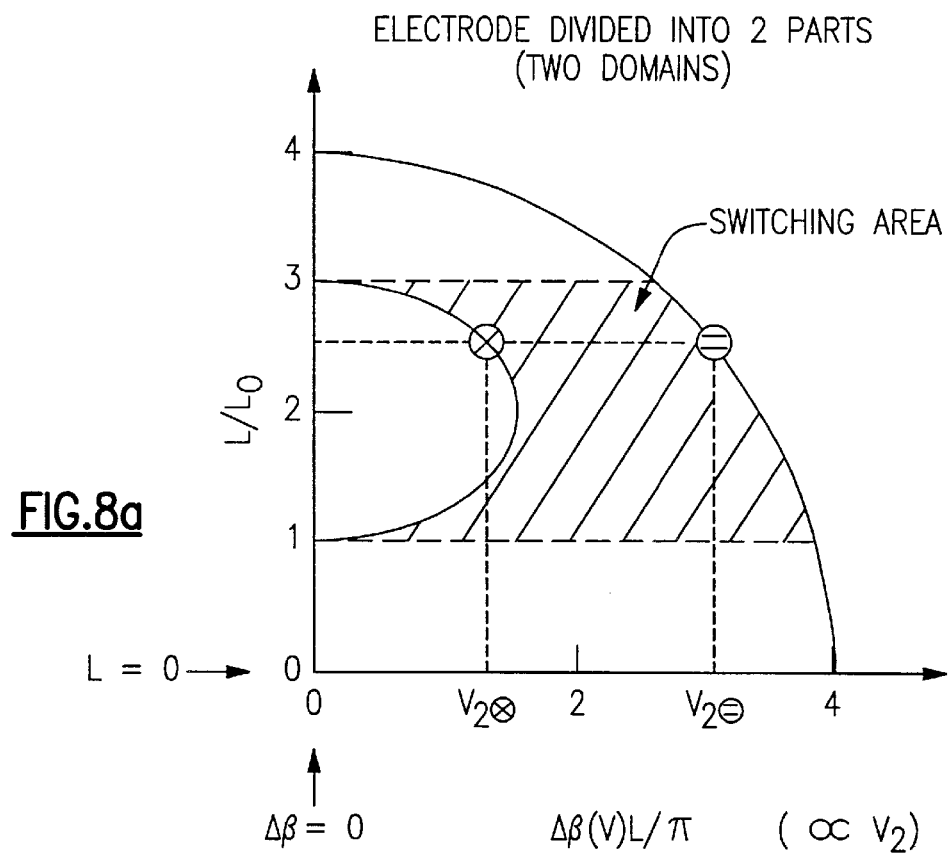
FIGS. 8a and 8b are graphs showing an example of simulation results for drive potential and electrode length.
Figure 8B:
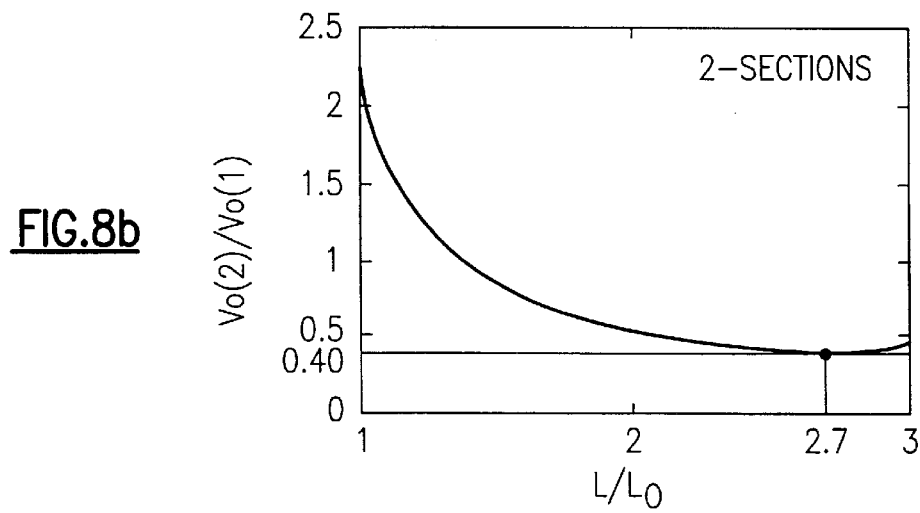

FIGS. 8a and 8b show switching diagrams for a directional coupler optical switch according to the present invention. As these figures show, the bar-state and the cross-state can be turned completely (100%) "on" by changing the electrode length and the signal potential. By setting up an optimal electrode length and signal potential, the drive potential (switching potential), i.e., the potential difference between $V_x$ and $V_=$, can be reduced.

Figure 7:
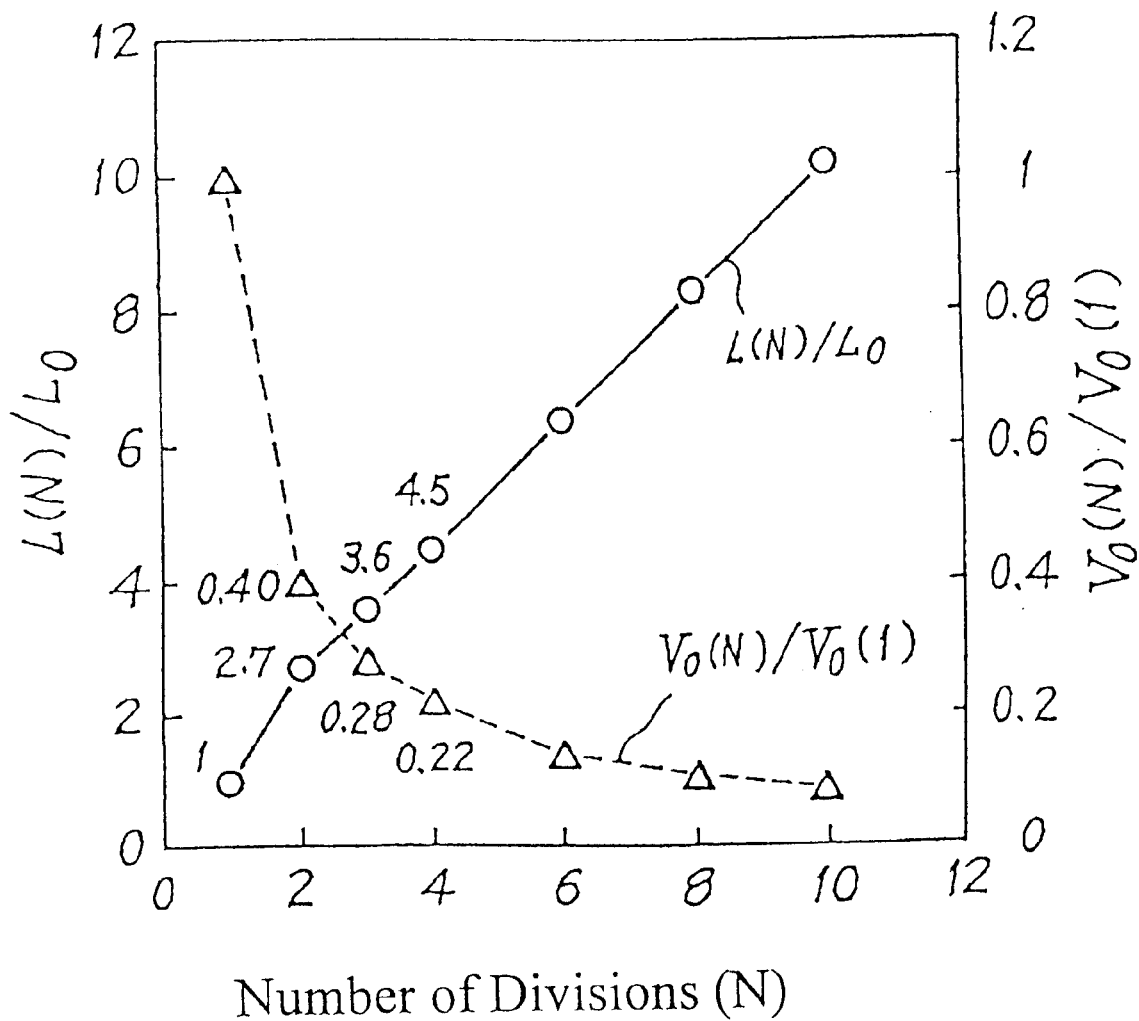
FIG. 7 is a graph showing results from a simulation of minimum drive potential and electrode length for various number of electrode divisions.

FIG. 7 shows the results of a simulation indicating (1) the relationship between the number of polarization domains/electrode divisions, N, and the electrode length L(N), and (2) the relationship between the number of polarization domains/electrode divisions, N, and the drive potential V(N). As with FIGS. 8a and 8b (and FIGS. 9a and 9b described below), FIG. 7 plots the minimum drive potential $V_0(N)$ and the electrode length L for various divisions N. Here, $V_0(1)$ and $L_0$ indicate the drive potential and the minimum perfect coupling length $L_0$ when potential is not applied to a conventional uniform electrode Δβ directional coupler with no electrode divisions. These results indicate that, while increasing the number of divisions decreases the drive potential, it also increases the electrode length. Thus, for the upper limit for electrode divisions, a division count of 30 divisions would be desirable since, in practical terms, more switches cannot be integrated. It would be even more desirable to use 10 divisions or less, most preferably 2 to 4 divisions.

Also, in domains with opposite polarization directions, such as the domains 5-1 and 5-2 shown in FIG. 1, it would be desirable to use sets of adjacent domains having opposite polarizations. As a result, in terms of the entire substrate, if the areas of the positive and negative domains directly under the electrodes are equal, the pyroelectric effect is canceled out and temperature drift can be restricted. Thus, the electrode used to modulate the light waves must be divided up into equal sections by at least some of the boundary surfaces of the plurality of reversed polarization domains.

In the directional coupler 1 shown in FIG. 1, electrodes 4-1 and 4-2 are divided into two sections by a single boundary surface 7 between the reversed polarization domains 5-1 and 5-2 that make up the substrate 2. If substrate 2 is made from a Z-cut plate, an even number of divisions would be desirable to prevent drift. However, if an X-cut plate or a Y-cut plate of ferroelectric single crystal that is not influenced by the pyroelectric effect is used, there are no particular restrictions on the number of boundary surfaces. Thus, if the substrate is formed from three or more polarization domains, the two or more boundary surfaces thereof can provide the electrode divisions into equal parts.

The number of equal parts into which electrodes are divided by the boundary surfaces of polarization domains is not restricted as long as there are at least two divisions as shown in FIG. 2. However, it would be desirable for the maximum number of divisions to be 30 divisions due to the increase being proportional to the minimum perfect coupling length $L_0$ when no potential is applied. It would be even more desirable to use 10 divisions. In practical terms, switching potential can be adequately reduced even with 2–4 divisions.

The reversed polarization domains 5-1 and 5-2 shown in FIG. 1 are polarized roughly perpendicular to a main surface 2A of the substrate 2. However, it is not a requirement that the polarization directions of the reversed polarization domains be roughly perpendicular to the substrate. As long as adjacent domains have opposite polarizations, the polarizations can be roughly parallel to the main surface of the substrate. Furthermore, the polarizations can also be at a fixed slope relative to the main surface of the substrate.

There are no particular restrictions on the materials that can be used for the substrate of the present invention as long as the material has electrooptic properties. However, it would be desirable to use at least one of the following: a lithium niobate single crystal, a lithium tantalate single crystal, a lithium niobate-lithium tantalate solid solution single crystal, a potassium lithium niobate single crystal, a potassium lithium niobate-potassium lithium tantalate solid solution single crystal, and a titanyl potassium phosphate single crystal. These materials are easily processed and have significant electrooptic properties. This allows the materials to be easily processed into flat substrates and allows the reversed polarization domains to be formed easily.

Also, for these materials, X-cut surfaces, Y-cut surfaces, Z-cut surfaces, and off-cut surfaces can be used according to the polarization directions of the reversed polarization domains. In this regard, there are no particular restrictions on the method used to form reversed polarization domains, and any method can be used.

If the substrate is to be formed with a Z-cut surface so that the polarization directions are roughly perpendicular to the main surface 2A of the substrate 2, the method described below, with reference to FIGS. 3–6, can be used.

If the substrate 2 is to be formed with two reversed polarization domains 5-1 and 5-2, as shown in FIG. 1, a flat electrode 12 (FIG. 3) is formed on a main surface 11A of a substrate 11, as shown in FIG. 3. The initial polarization direction in the substrate is represented by the arrow in domain 14-1. A uniform electrode 13 is formed on an opposite main surface 11B. Then, a predetermined potential $V_A$ is applied to the electrodes with a predetermined rise time, reversing the polarizations of the sections where the potential is applied. This results in the formation of the polarization domains 14-1 and 14-2 having opposite polarization directions.

If three or more reversed polarization domains are to be formed, a comb-shaped or a rack-shaped electrode 15 (FIG. 4) is formed on main surface 11A of substrate 11 in place of flat electrode 12 described above. A predetermined potential $V_B$ is applied to rack-shaped electrode 15 and uniform electrode 13 at a predetermined rise time, reversing the polarizations of the sections where the potential is applied. This results in the formation of a plurality of reversed polarization domains 16.

Figure 5:
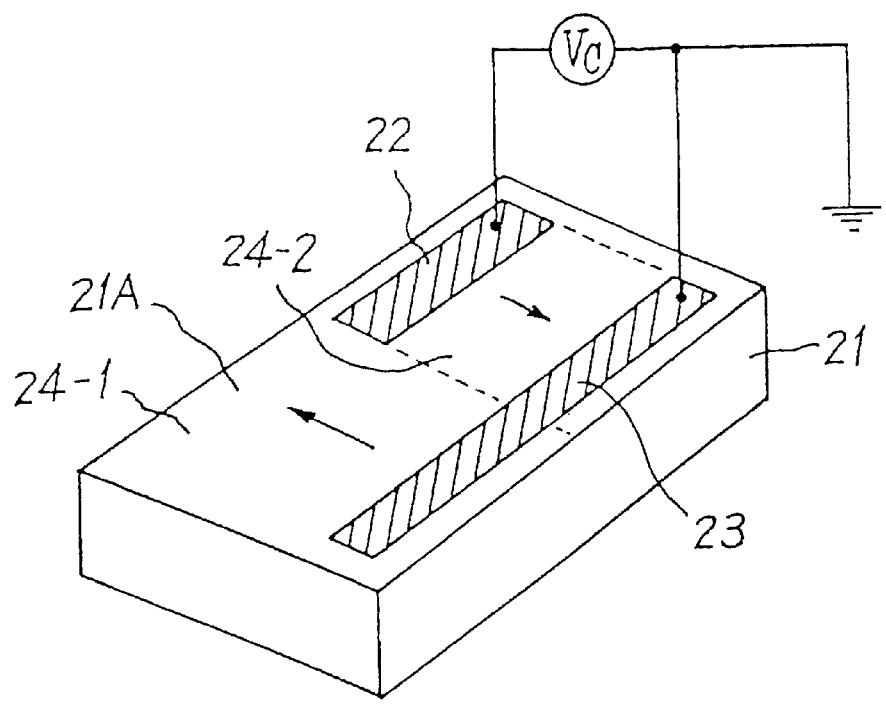
FIG. 5 is a perspective drawing showing yet another example of a method for forming reversed polarization domains.
Figure 6:
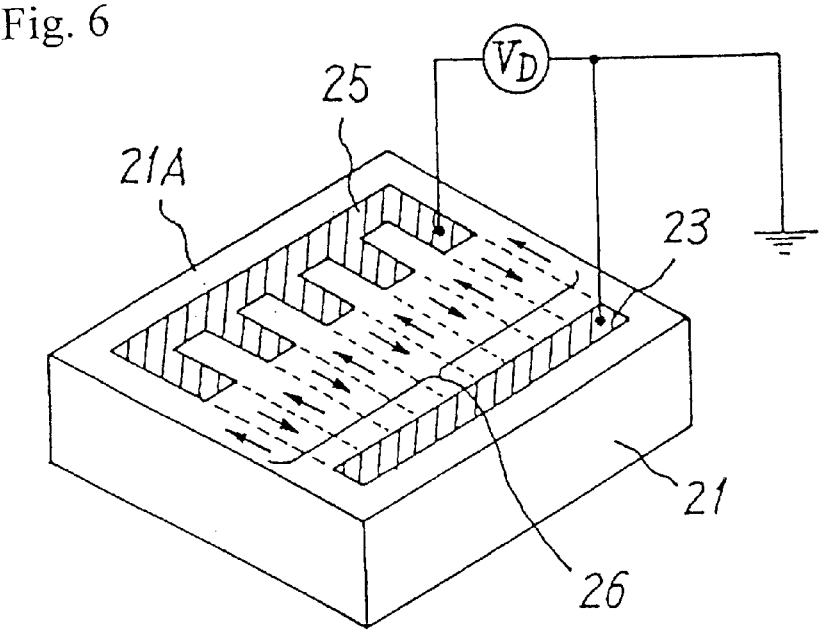
FIG. 6 is a perspective drawing showing another example of a method for forming reversed polarization domains.

When using an X-cut surface or the like for the material described above and forming reversed polarization structures having polarizations roughly parallel to the main surface of the substrate, a flat electrode 22 (FIG. 5) and a rod-shaped electrode 23, or a comb-shaped electrode 25 (FIG. 6) and a rod-shaped electrode 23 are formed on a main surface 21A of substrate 21. Next, a predetermined potential $V_C$ or $V_D$ is applied to the electrodes to form two reversed polarization domains 24-1 and 24-2 (FIG. 5) or a plurality of reversed polarization domains 26 (FIG. 6).

In the above cases, the electrodes can be formed using tantalum, gold, aluminum, platinum, chrome, copper, or the like.

EXAMPLE 1

A directional coupler 1 as shown in FIG. 1 is formed using a lithium niobate single crystal wafer having a thickness of 0.5 mm and a diameter of 3 inches. The flat electrode 12, as shown in FIG. 3, is formed using photolithography on a main surface 2A of the wafer. An electrode 13 is formed in the same manner on the opposite main surface. A potential of 20 kV/mm is then applied with a rise time of 0.5 msec to electrodes 12 and 13 to reverse the polarization direction in region 14-2 to provide reversed polarization domain 5-2. The reversed polarization domains divide the structure into equal sections along its length (R), as shown in FIG. 1. Electrodes 12 and 13 then removed.

Next, after performing patterning on the main surface 2A using photolithography, the substrate 2 is immersed for 30 minutes in benzoic acid at 200° C. to perform proton exchange. Substrate 2 is then annealed for 4 hours at 300° C. to form optical waveguides 3-1 and 3-2. The difference in index of refraction, Δn, between the effective index of refraction of the waveguides and the index of refraction of the substrate is $4 \times 10^{-3}$ and the distance between waveguides is 4 microns.

Next, a layer of $SiO_2$ having a thickness of 0.2 microns is formed as a buffer layer. Traveling wave electrodes 4-1 and 4-2 are formed along a coupling section from gold using vaporization and then the substrate is processed to a length "R" of 50 mm and a width of 5 mm. The electrode length, L, in this case is 25 mm. The end surfaces of the substrate are then ground to form the directional coupler 1 shown in FIG. 1.

EVALUATION

Optical fibers are coupled to optical waveguides 3-1 and 3-2 of the directional coupler 1 and a light wave, having a wavelength of 1550 nm, is introduced to evaluate temperature drift. Since electrodes 4-1 and 4-2 are formed with two equal areas in reversed polarization domains, induction accompanying temperature changes cause the pyroelectric load to cancel out. Thus, no temperature drift was observed.

Using equation (1) (for cross state) and equation (2) (for bar state) shown below, a simulation was performed for the electrode length L and the applied potential difference (drive potential) between bar-state "on" and cross-state "on" for a light wave with a wavelength of 1550 nm. The results are shown in FIGS. 8a and 8b. In FIG. 8a, the drive potential (switching potential) is defined as follows: $V_0(2)=V_-(2)-V_x(2)$. FIG. 8b shows that the drive potential is lowest when $L/L_0$ is 2.7, and that the drive potential at $L/L_0=2.7$ is only about 40% of the drive potential to create a bar state in a conventional uniform electrode $\Delta\beta$ directional coupler with no electrode divisions. When a directional coupler was produced as described above with an electrode length of 25 mm, the drive potential was 2.9 V and the maximum modulation speed was 10 GHz.

$$\frac{4}{4+\left(\frac{\Delta\beta}{K}\right)^2}\sin^2\frac{\pi}{8}\frac{L}{Lo}\sqrt{4+\left(\frac{\Delta\beta}{K}\right)^2} = \frac{1}{2} \quad (1)$$

$$\left(\frac{L}{Lo}\right)^2 + \left(\frac{1}{2}\frac{\Delta\beta}{K}\frac{L}{Lo}\right)^2 = 16 \quad (2)$$

wherein
L: electrode length
$L_0$: minimum perfect coupling length with uniform electrode $\Delta\beta$
directional coupler
K: coupling coefficient
$\Delta\beta$: propagation constant difference

EXAMPLE 2

Reversed polarization domains, optical waveguides, and traveling wave electrodes are formed as in Example 1. Then, using a KrF excimer laser, spot-scanning is performed to form grooves on the surface of the substrate opposite from the surface on which the waveguides and the traveling wave electrodes are formed (please refer to copending application Ser. No. 08/922,020, filed Sep. 2, 1997, the entirety of which is incorporated herein by reference). The size of the laser spot is 1.0 mm in the direction of operation, with a width of 0.2 mm, and the beam energy is 6 $J/cm^2$. The pulse width is 15 nsec, the pulse frequency is 600 Hz, and the operation speed is 0.1 mm/sec. As a result, the maximum modulation speed increased to 40 GHz. Additionally, no temperature drift was observed for the same reasons explained in Example 1.

EXAMPLE 3

A directional coupler is produced in the same manner as in Example 1 except that instead of the flat electrode 12 shown in FIG. 3, the comb-shaped electrode 15 shown in FIG. 4 is used to form four, adjacent reversed polarization domains separated by three boundary surfaces that divide the electrodes into four equal sections.

Figure 9A:
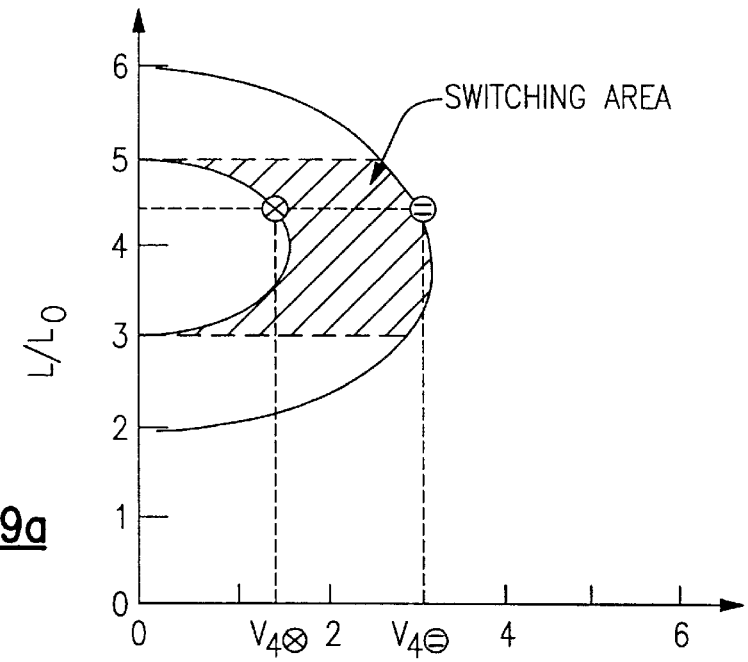
FIGS. 9a and 9b are graphs showing another example of simulation results for drive potential and electrode length.
Figure 9B:
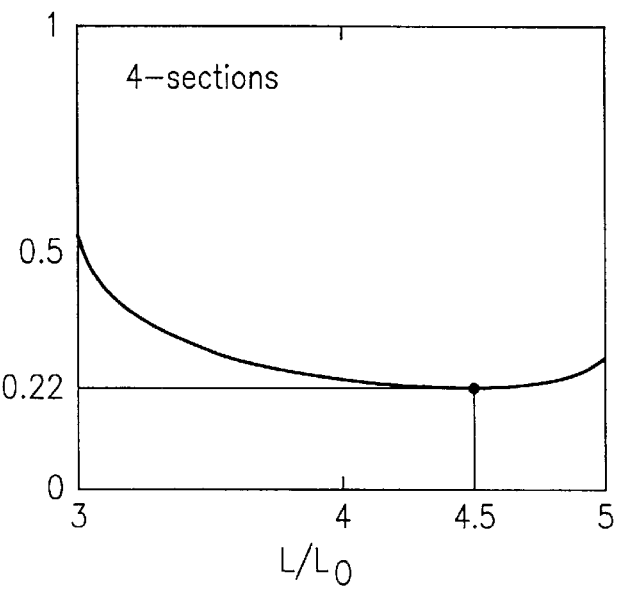

As in Example 1, a simulation was performed for the electrode length L and the drive potential using equation (3) (for cross state) and equation (4) (for bar state) below. The results are shown in FIGS. 9a and 9b. In FIG. 9a, the drive potential (switching potential) is defined as follows: $V_0(4)=V_-(4)-V_x(4)$. FIG. 9b shows that the drive potential is lowest when $L/L_0$ is 4.5, and that the drive potential at $L/L_0=4.5$ is only about 22% of the drive potential to create a bar state in a conventional uniform electrode $\Delta\beta$ directional coupler with no electrode divisions. When a directional coupler having an electrode length of 41 mm was actually produced, the drive potential was 1.6 V and the maximum modulation speed was 10 GHz.

$$\frac{4}{4+\left(\frac{\Delta\beta}{K}\right)^2}\sin^2\frac{\pi}{16}\frac{L}{Lo}\sqrt{4+\left(\frac{\Delta\beta}{K}\right)^2} = \frac{1}{2}\left(1+\frac{1}{\sqrt{2}}\right) \quad (3)$$

$$\frac{4}{4+\left(\frac{\Delta\beta}{K}\right)^2}\sin^2\frac{\pi}{16}\frac{L}{Lo}\sqrt{4+\left(\frac{\Delta\beta}{K}\right)^2} = \frac{1}{2} \quad (4)$$

wherein
L: electrode length
$L_0$: minimum perfect coupling length with uniform electrode $\Delta\beta$
directional coupler
K: coupling coefficient
$\Delta\beta$: propagation constant difference Additionally, no temperature drift was observed for the same reasons explained in Example 1.

EXAMPLE 4

An X-cut lithium niobate single crystal having the same size as that of Example 1 is used. Next, flat electrode 22 and rod-shaped electrode 23, as shown in FIG. 5, are formed on the substrate using photolithography. Then, a 20 kV/mm potential with a rise time of 0.5 msec is applied to the electrodes. The substrate is divided into equal sections along length R. This forms two reversed polarization domains having polarization directions roughly parallel to the main surface of the substrate. Electrodes 22 and 23 are then removed.

Next, optical waveguides and traveling wave electrodes are formed in the same manner as in Example 1 to produce the final directional coupler. In this case, the electrode length is 30 mm.

EVALUATION

An optical fiber is connected as in Example 1, and the drive potential and the maximum modulation speed were observed. As a result, it was found that the drive potential was 4 V and the maximum modulation speed was 10 GHz. Additionally, no temperature drift was observed for the same reasons explained in Example 1.

EXAMPLE 5

In this example, directional coupler optical waveguides are formed using Ti diffusion. Then, as in Example 1, two reversed electrode domains dividing the substrate along the length R and traveling wave electrodes are formed to produce a directional coupler as shown in FIG. 1. In this case, the difference in index of refraction, Δn, between the effective index of refraction of the waveguides and the index of refraction of the substrate is $3 \times 10^{-3}$ and the distance between waveguides is 4 microns. As a result, the electrode length is 16 mm, which is shorter than in Example 1, and conversely the drive potential is higher, at 4.4 V. The reason for this is believed to be that the small refraction index difference Δn of the Ti diffusion waveguides increases the inter-mode coupling between waveguides 3-1 and 3-2. This reduces the electrode length and conversely increases the mode size of the waveguides, reducing the electric field in the Z direction and increasing the drive potential. Additionally, no temperature drift was observed for the same reasons explained in Example 1.

EXAMPLE 6

To increase the index of refraction difference, Δn, between the effective index of refraction of the waveguides and the effective index of refraction of the substrate, a film with Zn doping is formed by liquid phase epitaxy on a Z-cut lithium niobate substrate. Then, directional coupler waveguides are formed by etching. Next, two reversed polarization domains dividing the substrate along the length R and traveling wave electrodes are formed, as in Example 1. This results in the production of a directional coupler optical switch as shown in FIG. 1. The index of refraction difference between the effective index of refraction of the waveguides and the effective index of refraction of the substrate is $5 \times 10^{-3}$ and the distance between the waveguides is 4 microns. As a result, the electrode length is 36 mm, which is longer than in Example 1, and conversely the drive potential is reduced to 1.8 V. Additionally, no temperature drift was observed for the same reasons explained in Example 1.

COMPARATIVE EXAMPLE 1

As in Example 1, Z-cut lithium niobate is used as the substrate material, and a directional coupler is produced in the same manner as in Example 1 except that reversed polarization domains are not formed in the substrate.

EVALUATION

The drive potential and the maximum modulation speed were examined as in Example 1, and temperature drift was observed. The drive potential was 7.3 V and the maximum modulation speed was 100 MHZ.

COMPARATIVE EXAMPLE 2

For the substrate 2, Z-cut lithium niobate having the same size as that of Example 1 is used, and proton-exchange optical waveguides are formed as in Example 1. Next, photolithography is used to form an $SiO_2$ buffer layer. Reversed Δβ electrode patterns are formed, and Au electrodes are formed using vaporization. As a result, the drive potential was 5 V and the maximum switching speed was 1 GHz.

As is clear from Examples 1–3, the directional couplers according to the present invention allow the bar-state and the cross-state to be turned on by controlling the applied potential, i.e., switching is possible. Furthermore, based on Examples 1–6 and Comparative Examples 1 and 2, the directional couplers according to the present invention provide high-speed modulation and low drive potential compared to uniform Δβ and reversed Δβ directional couplers that do not include reversed polarization domains in the substrate. In addition, with the directional coupler according to the present invention, temperature drift is substantially eliminated.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A directional coupler comprising:
    a substrate having opposed main surfaces and a length, and comprising a material that exhibits electrooptic properties, said substrate being divided into at least two reversed polarization domains along a direction of said length;
    at least two optical waveguides formed in said substrate in the direction of length thereof and substantially parallel to a main surface of said substrate; and
    an electrode disposed above a portion of each optical waveguide for modulating light waves propagating through said waveguides, respectively, each said electrode being divided substantially equally by a planar extension of a boundary surface between said reversed polarization domains.

2. The directional coupler of claim 1, wherein said boundary surface lies substantially perpendicular to the main surfaces of said substrate and substantially perpendicular to the direction of length of said substrate.

3. The directional coupler of claim 1, wherein polarization directions of said reversed polarization domains are substantially perpendicular to said main surfaces of said substrate.

4. The directional coupler of claim 1, wherein polarization directions of said reversed polarization domains are substantially parallel to said main surfaces of said substrate.

5. The directional coupler of claim 1, wherein said reversed polarization do mains comprise an even number of adjacent domain sets.

6. The directional coupler of claim 2, wherein said reversed polarization domains comprise an even number of adjacent domain sets.

7. The directional coupler of claim 3, wherein said reversed polarization domains comprise an even number of adjacent domain sets.

8. The directional coupler of claim 1, wherein the material of said substrate comprises at least one material selected from the group consisting of lithium niobate single crystal, lithium tantalate single crystal, lithium niobate-lithium tantalate solid solution single crystal, potassium lithium niobate single crystal, potassium lithium niobate-potassium lithium tantalate solid solution single crystal, titanyl potassium phosphate single crystal, and gallium-arsenic single crystal.

9. The directional coupler of claim 2, wherein the material of said substrate comprises at least one material selected from the group consisting of lithium niobate single crystal, lithium tantalate single crystal, lithium niobate-lithium tantalate solid solution single crystal, potassium lithium niobate single crystal, potassium lithium niobate-potassium lithium tantalate solid solution single crystal, titanyl potassium phosphate single crystal, and gallium-arsenic single crystal.

10. The directional coupler of claim 3, wherein the material of said substrate comprises at least one material selected from the group consisting of lithium niobate single crystal, lithium tantalate single crystal, lithium niobate-lithium tantalate solid solution single crystal, potassium lithium niobate single crystal, potassium lithium niobate-potassium lithium tantalate solid solution single crystal, titanyl potassium phosphate single crystal, and gallium-arsenic single crystal.

11. The directional coupler of claim 1, further comprising a buffer layer positioned between said substrate and said electrodes.

12. A method of making a directional coupler comprising:
providing a substrate comprising a material that exhibits electrooptic properties;
subjecting the substrate to a polarization treatment to create at least two reversed polarization domains separated from one another by a boundary surface that lies substantially perpendicular to opposed main surfaces of the substrate and substantially perpendicular to the direction of length of the substrate;
forming at least two optical waveguides in at least one of the two main surfaces of the substrate, the waveguides extending generally in the direction of length of the substrate and intersecting a planar extension of said boundary surface; and
forming an electrode above a portion of each optical waveguide for modulating light waves propagating through the waveguides, respectively, each electrode being divided substantially equally by the planar extension of said boundary surface.

13. The method of claim 12, wherein the substrate has an initial polarization throughout, and the polarization treatment comprises the step of applying an electric field to a portion of the substrate to reverse the polarization therein and thus form the two reversed polarization domains within the substrate.

14. The method of claim 13, wherein the electric field is applied between the opposite main surfaces of the substrate.

15. The method of claim 14, wherein polarization directions of the reversed polarization domains are substantially perpendicular to the main surfaces of the substrate.

16. The method of claim 15, wherein the electric field is applied through an electrode having multiple extensions, to thus form a corresponding number of reversed polarization domains within the substrate.

17. The method of claim 16, wherein the reversed polarization domains comprise an even number of adjacent domain sets.

18. The method of claim 13, wherein the electric field is applied between two regions of the main surface of the substrate on which the waveguides are to be formed.

19. The method of claim 18, wherein polarization directions of the reversed polarization domains are substantially parallel to the main surfaces of the substrate.

20. The method of claim 19, wherein the electric field is applied through an electrode having multiple extensions, to thus form a corresponding number of reversed polarization domains within the substrate.

21. The method of claim 20, wherein the reversed polarization domains comprise an even number of adjacent domain sets.

22. The directional coupler of claim 1, wherein each of said optical waveguides has an independent input port.

23. The method of claim 12, wherein each of said optical waveguides has an independent input port.

* * * * *